United States Patent
Morimoto et al.

(10) Patent No.: US 9,113,095 B2
(45) Date of Patent: Aug. 18, 2015

(54) IMAGING DEVICE WITH THE AUTOFOCUS

(71) Applicant: HITACHI, LTD., Tokyo (JP)

(72) Inventors: Miya Morimoto, Hitachinaka (JP); Tomoaki Nishiguchi, Mito (JP)

(73) Assignee: HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 282 days.

(21) Appl. No.: 13/863,431

(22) Filed: Apr. 16, 2013

(65) Prior Publication Data

US 2013/0271611 A1  Oct. 17, 2013

(30) Foreign Application Priority Data

Apr. 17, 2012  (JP) .................................. 2012-093470

(51) Int. Cl.
*H04N 5/33* (2006.01)
*H04N 5/57* (2006.01)
*H04N 5/232* (2006.01)
*G03B 11/00* (2006.01)
*G03B 13/36* (2006.01)

(52) U.S. Cl.
CPC .................. *H04N 5/33* (2013.01); *G03B 11/00* (2013.01); *G03B 13/36* (2013.01); *H04N 5/23212* (2013.01)

(58) Field of Classification Search
CPC ............................ G03B 13/36; H04N 5/23212
USPC ......... 348/345, 353, 164, 252, 255, 673, 686, 348/687, 678; 382/255, 263, 275
See application file for complete search history.

(56) References Cited

U.S. PATENT DOCUMENTS

| | | | |
|---|---|---|---|
| 8,537,264 B2 * | 9/2013 | Ono ............................. | 348/345 |
| 2012/0081597 A1 * | 4/2012 | Nishiguchi et al. .......... | 348/345 |

FOREIGN PATENT DOCUMENTS

| | | |
|---|---|---|
| JP | 11-174521 A | 7/1999 |
| JP | 2003-287674 A | 10/2003 |
| JP | 2008-76878 A | 4/2008 |
| JP | 2009-103800 A | 5/2009 |
| JP | 2010-49001 A | 3/2010 |
| JP | 2011-239022 A | 11/2011 |
| JP | 2012-479775 A | 3/2012 |

OTHER PUBLICATIONS

Japanese Office Action received in corresponding Japanese Application No. 2012-093470 dated May 12, 2015.

* cited by examiner

*Primary Examiner* — Jefferey Harold
*Assistant Examiner* — Jean W Desir
(74) *Attorney, Agent, or Firm* — Mattingly & Malur, PC

(57) ABSTRACT

An imaging device performs optimum focus correction at low cost with an autofocus device that moves a lens for focusing an image. The imaging device includes a camera signal processing part having a contrast signal generation part that extracts a high frequency component from a video signal and generates a contrast signal of the video signal based on the extracted high frequency component. The imaging device also has a controller that performs focus control based on the contrast signal. The controller performs an ON/OFF control of an infrared rays cut filter and includes a recording part to hold a set value of an ON/OFF state of the infrared rays cut filter. The camera signal processing part includes a signal conversion processing part to change a ratio of RGB of the video signal to be sent to the contrast signal generation part based on the set value.

6 Claims, 3 Drawing Sheets

IMAGING DEVICE WITH THE AUTOFOCUS

BACKGROUND OF THE INVENTION

1. Field of the Invention

The present invention relates to an autofocus control in an imaging device such as a camera.

2. Description of Related Art

A contrast system and a color distortion system are known as a method of autofocus incorporated in a digital video camera or the like. In the contrast system, contrasts of a photographed image are detected, the contrasts at respective positions are compared, and a position where the focus of a lens coincides with a subject is determined. In order to use this method, it is necessary to detect the lens position where the contrast becomes maximum.

In the color distortion system, the focal position of a lens varies according to R (Red), G (Green) and B (Blue) components of light, and this is used to detect a focusing position based on comparison results of magnitudes of high frequency components of the respective colors (JP-A-2009-103800).

In a video camera, since a red LED (wavelength 700 nm) or the like is generally used as an auxiliary light source, an out-of-focus occurs due to the color distortion of a lens. A camera microcomputer performs focus correction at the time of red LED light emission, so that a sharp focus is obtained at the time of strobe main light emission. In the system using the strobe incorporating the AF assist light for still image photography in a dark place as stated above, there is also a method in which the AF assist light (red LED, wavelength 700 nm) is made to emit light in focusing by autofocus, and focus correction is performed (JP-A-11-174521).

A lens has a feature that near infrared light is captured in addition to visible light. However, a filter to cut the near infrared light which is not seen by human eyes is used, so that only the visible light can form an image. A green component is the center wavelength of the visible light, and an image to be photographed often has an average RGB contrast. Thus, focus adjustment is often performed based on the green component. In the method of performing the focus adjustment based on the green component, an original video signal is not directly used as a video signal which is used when a contrast signal is generated. A video signal is used which is changed by changing gains for red, green and blue for the respective RGB components of the original video signal. The gain for green used in this conversion is made larger than the gain for red and the gain for blue, and the ratio of the green component is made large. In general, the conversion equation is expressed by the following equations.

luminance of red component of video signal after conversion=gain for red×luminance of red component of original video signal (1)

luminance of green component of video signal after conversion=gain for green×luminance of green component of original video signal (2)

luminance of blue component of video signal after conversion=gain for blue×luminance of blue component of original video signal (3)

luminance=0.3 R (brightness of red luminance)+0.59 G (brightness, of green luminance)+0.11 B (brightness of blue luminance) (4)

Here, in general, the ratio is made gain for red:gain for green:gain for blue=0.3:0.59:0,11, and 0.3 is used as the gain for red, 0.59 is used as the gain for green, and 0.11 is used as the gain for blue (or 0.9, 1.77 and 0.33 obtained by multiplying the respective values by 3 are used). A contrast signal is generated by using the video signal after conversion, and the lens position where the contrast signal becomes maximum is detected and focusing is performed.

When this method is used, since a complicated calculation is not required to be performed, calculation time becomes short. Thus, this method is used for many lenses. Besides, the reason why focusing is performed based on green is that, since the human sensitivity becomes maximum at approximately the green component, there is also an intension to perform focusing based on the component close to the maximum human sensitivity.

An infrared rays cut filter 27 is a filter that allows visible light to pass through and cuts near infrared light. The infrared rays cut filter 27 is turned OFF and the near infrared light is captured, so that a red component becomes large in an image captured by a camera. However, when focus correction is performed by such a method, the red component becomes large when the infrared rays cut filter is OFF (when the infrared rays cut filter is removed). Thus, when focus correction is performed based on the green component, out-of-focus occurs, and the image can become blurred. The remarkable example appears when the infrared rays cut filter is removed.

FIG. 2 is an image view of a focus position. Since the focal position of the green component is the center of RGB, in a normal image, it is appropriate if focusing is adjusted at the position of a focal distance (G) 41 based on green light. However, when an image containing a large red component is captured as in the case where the infrared rays cut filter is removed, it is appropriate if focusing is adjusted at a focal distance (R) 40. However, in the related art method, since focusing is adjusted at the focal distance (G) 41, out-of-focus occurs, and the image becomes blurred.

Besides, there are problems also in the cost and system, and there is also a case where it is difficult to, incorporate an assist light and the like into the autofocus.

SUMMARY OF THE INVENTION

The invention proposes a system for performing optimum focus correction in an autofocus of an image in which a lot of near infrared light is captured when an infrared rays cut filter is OFF.

In order to implement the proposal, for example, structures recited in the appended claims are adopted. The present invention includes plural means for implementing the proposal, and one example is as recited in claim 1.

In the autofocus of an image in which a lot of near infrared light is captured when the infrared rays cut filter is OFF, the focusing can be simply adjusted by only software change and without a significant change such as additional of a device.

DETAILED DESCRIPTION

Hereinafter, embodiments will be described with reference to the drawings.

Embodiment 1

(1) Structure of Imaging Device of the Embodiment

Figure 1:
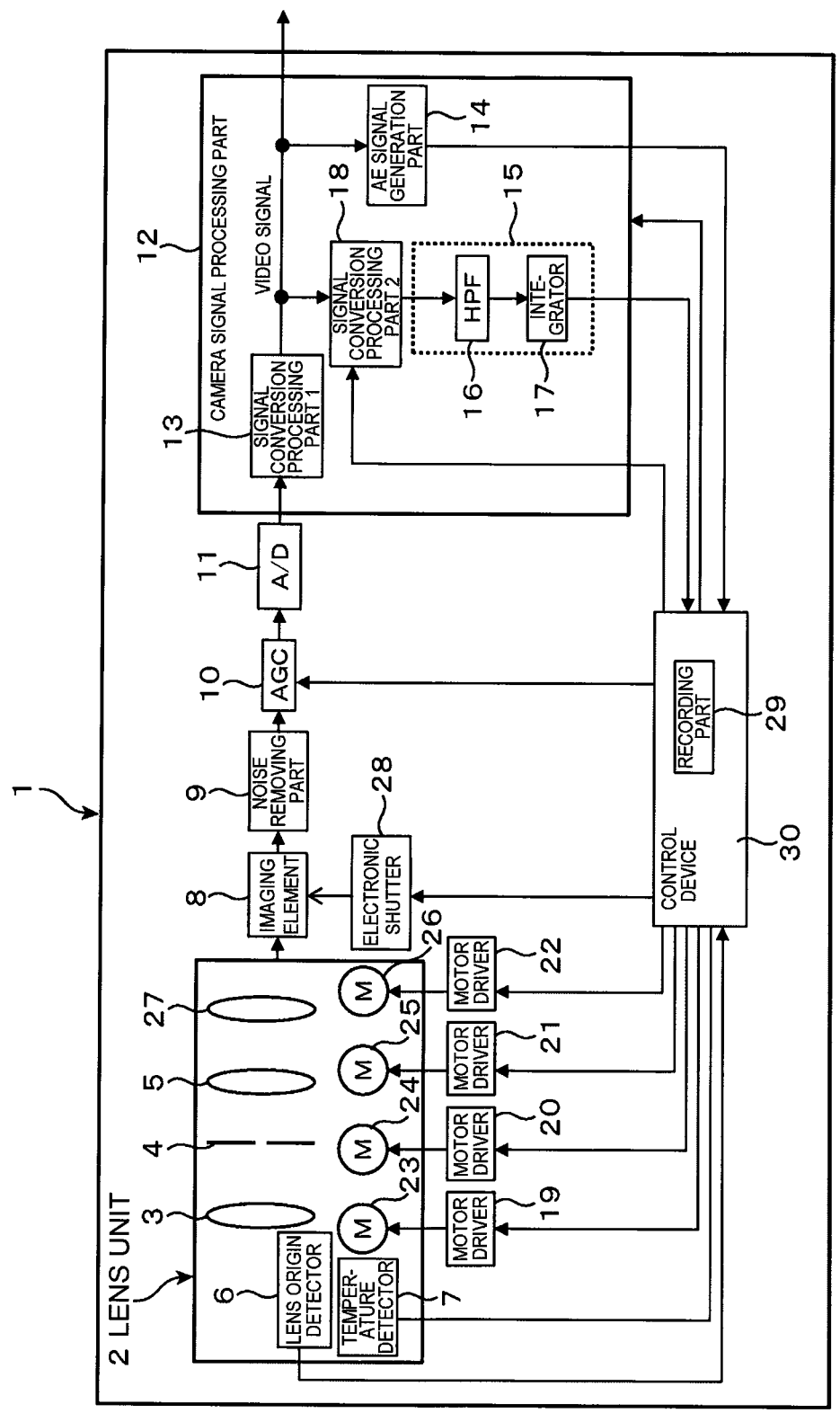
FIG. 1 is a block diagram showing the whole structure of an imaging device of an embodiment.
Figure 2:
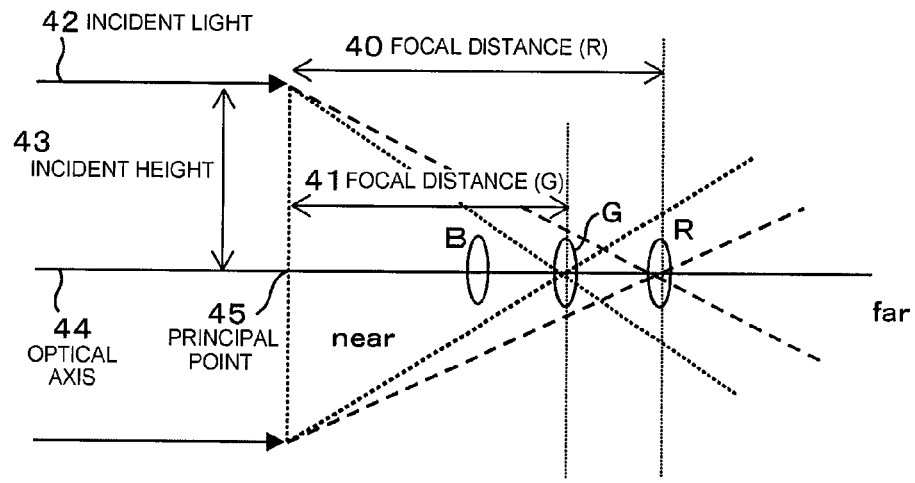
FIG. 2 is an image view of focus positions in the embodiment.

FIG. 1 shows an example of a structural view of an embodiment. An imaging device 1 includes a lens unit 2 that includes a variator lens group 3 to adjust light from a subject, a diaphragm 4 to adjust received light quantity, a focus lens group 5 having a focus adjustment function, and an infrared rays cut filter 27. An optical image of the subject is formed on a light receiving side of an imaging element 8 including a CCD and the like. Besides, the lens unit 2 includes a lens origin detector 6 including a photo interrupter and the like, and a temperature detector 7. The lens origin detector 6 detects the origin position of the variator lens group 3, and transmits the detection result as lens origin position detection information to a high-pass filter processing part 16. The temperature detector 7 detects the temperature in the lens unit 2, and transmits the detection result as lens unit inside temperature information to a control part 30.

The imaging element 8 photoelectrically converts the optical image of the subject formed on the light receiving side, and sends an obtained imaging signal to a noise removal part 9. The imaging signal is subjected to a noise removal process by the noise removal part 9, and is amplified to an optimum level by an auto gain controller (AGC) 10. Further, the signal is digital-converted by an analog/digital conversion part 11, and then is given as a digital imaging signal to a camera signal processing part 12.

The camera signal processing part 12 performs a signal processing of the supplied digital imaging signal in a first signal conversion processing part 13, so that the digital imaging signal is converted into a video signal with a standard signal format based on the NTSC (National Television Standard Committee) standard or the PAL (Phase Alternating Line) standard, and is outputted to the outside. Besides, an AE signal generation part 14 of the camera signal processing part 12 generates an auto iris signal AE with a signal level according to the brightness of a present photographed image based on the video signal, the open degree of the diaphragm 4 of the lens unit 2, the gain of auto gain control and the like, and sends the signal to the control part 30.

Figure 3:
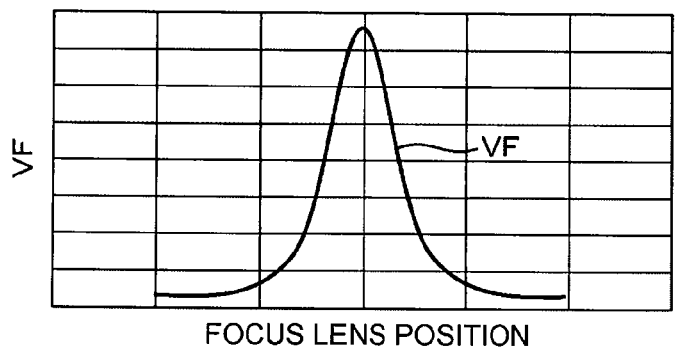
FIG. 3 is a characteristic curve view showing a relation between a position of a focus lens group and a signal level of a first and a second contrast signal.

The camera signal processing part 12 extracts a high frequency component of the luminance signal of the video signal generated by the first signal conversion processing part 13 through the high-pass filter processing part 16 of a contrast signal generation part 15, and performs an integration process by an integrator 17. As a result, a contrast signal VF as shown in FIG. 3 is generated. The camera signal processing part 12 sends the contrast signal VF obtained in this way to the control part 30.

The control part 30 includes information processing resources such as a CPU (Central Processing Unit) and an inner memory. The control part 30 calculates an auto iris evaluation value as an evaluation value to the brightness of the present photographed image recognized by the auto iris signal AE, the open degree of the diaphragm 4 of the lens unit 2, the gain of the auto gain control and the like based on an auto iris data processing program (AEP) and an auto focus data processing program (AFP) stored in the inner memory, and acquires an auto focus evaluation value as a value of the contrast signal VF.

When, for example, a not-shown zoom button of the imaging device 1 is operated, the control part 30 generates a first motor control signal in response to the operation, and sends the signal to a first motor driver part 19. The first motor driver part 19 drives a first motor 23 based on the first motor control signal, and moves the variator lens group 3 in its optical axis direction. By this, the zoom magnification is changed to a magnification corresponding to the operation of the zoom button.

At this time, the control part 30 generates zoom magnification information expressing the present zoom magnification based on the lens origin position detection information given from the lens origin detector 6 of the lens unit 2 and the angle information expressing the rotation angle of an output shaft of the first motor 23 and given from a rotary encoder not shown in the drawing and provided on the first motor 23. Then, the control part generates a third motor control signal based on the zoom magnification information, the autofocus evaluation value, and the lens unit inside temperature information given from the temperature detector 7 of the lens unit 2, and send the signal to a third motor driver part 21. In this way, the third motor driver part 21 drives a third motor 25 based on the third motor control signal, and moves the focus lens group 5 in its optical axis direction. By this, the focus is adjusted according to the variation of the zoom magnification (autofocus control).

Further, the control part 30 generates a second motor control signal based on the auto iris evaluation value, and sends the signal to a second motor driver part 20. In this way, the second motor driver part 20 drives a second motor 24 based on the second motor control signal, and opens or closes the diaphragm 4 as needed. By this, the iris is adjusted based on the brightness of the photographed image (auto iris control).

Further, the control part 30 performs light quantity adjustment of an optical image of a subject formed on the light receiving side of the imaging element 8 by controlling the shutter speed of an electronic shutter 28 so as to increase or decrease the exposure time to the imaging element 8, and performs gain adjustment in the auto gain controller 10 based on the auto iris evaluation value.

Further, when, for example, a not-shown ON/OFF button of the infrared rays cut filter of the imaging device 1 is operated, the control part 30 generates a fourth motor control signal in response to this operation, and sends the signal to a fourth motor driver part 22. The fourth motor driver part 22 drives a fourth motor 26 based on the fourth motor control signal, and raises or lowers the infrared rays cut filter 27. By this, the state of the presence or absence of the infrared rays cut filter 27 is changed according to the operation of the ON/OFF button of the infrared rays cut filter.

(2) Autofocus Control System of the Embodiment

Light captured by the lens group 3 contains a lot of near infrared light in addition to visible light. Thus, when photographing is performed in the day time or indoor environment, if the near infrared light is captured, the image becomes reddish. Thus, the infrared rays cut filter 27 to cut the near infrared light is provided.

The control part 30 performs the control of ON/OFF of the infrared rays cut filter 27. The control part 30 includes a recording part 29 to hold the set value of the ON/OFF state of the infrared rays cut filter 27, and the control part 30 sends the state of the infrared rays cut filter 27 to a second signal conversion processing part 18. The second signal conversion processing part 18 can change the ratio of luminance magnitudes of RGB. The second signal conversion processing part 18 changes the ratio of RGB of the video signal to be sent to the contrast signal generation part 15 based on the set value of the ON/OFF state of the infrared rays cut filter 27.

Specifically, the second signal conversion processing part 18 converts the video signal based on the following expressions.

luminance of red component of video signal after conversion=gain for red×luminance of red component of original video signal        (1)

luminance of green component of video signal after conversion=gain for green×luminance of green component of original video signal        (2)

luminance of blue component of video signal after conversion=gain for blue×luminance of blue component of original video signal        (3)

When the infrared rays cut filter 27 is ON, the gain for green is made larger than the gain for red and the gain for blue. For example, when the ratio is made gain for red:gain for green:gain for blue=0.3:0.59:0.11, 0.3 is used as the gain for red, 0.59 is used as the gain for green, and 0.11 is used as the gain for blue (or 0.9, 1.77 and 0.33 obtained by multiplying the respective values by 3 are used). Incidentally, the numerical values are merely exemplary, and can be appropriately changed. The ratio of the gain for green in the ratio of gain for red:gain for green:gain for blue is desirably 0.5 or more.

When the infrared rays cut filter 27 is OFF, the gain for red is made larger than the gain for green and the gain for blue. For example, the ratio is made gain for red:gain for green:gain for blue=0.59:0.3:0.11. For example, 0.59 is used as the gain for red, 0.3 is used as the gain for green, and 0.11 is used as the gain for blue (or 1.77, 0.9 and 0.33 obtained by multiplying the respective values by 3 are used). Incidentally, the numerical values are merely exemplary, and can be appropriately changed. The ratio of the gain for red in the gain for red:the gain for green:the gain for blue is desirably 0.5 or more. However, if the gain for blue is made less than the gain for red, matching to the human eye sensitivity can be provided. On the contrary, if the gain for blue is made larger than the gain for red, an unnatural white and black image is formed. However, with respect to the focusing, there is no problem in any case. Besides, when the infrared rays cut filter is OFF, since something that a person desires to see is an image containing a large infrared portion, there is no problem even if the gain for green<the gain for blue is established or the gain for blue<the gain for green is established.

The contrast signal generation part 15 generates the contrast signal VF based on the sent video signal after conversion.

Figure 6:
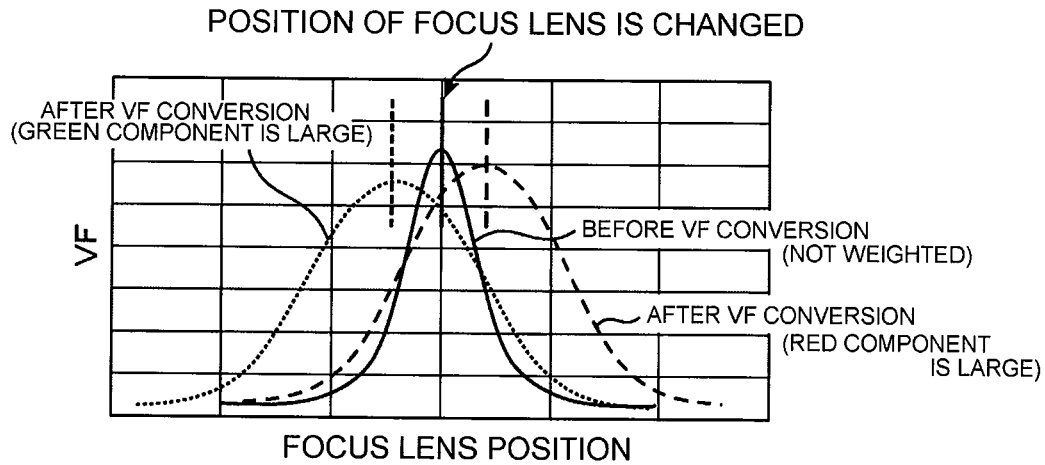
FIG. 6 is a view showing contrast signals before conversion and after conversion.

FIG. 6 shows the contrast signal VF before conversion and after conversion. When the ratio of the red component and the ratio of the green component are made larger than that of the other component, the lens position where the contrast signal VF after conversion becomes maximum is different from the lens position where the contrast signal VF before conversion becomes maximum.

Figure 4:
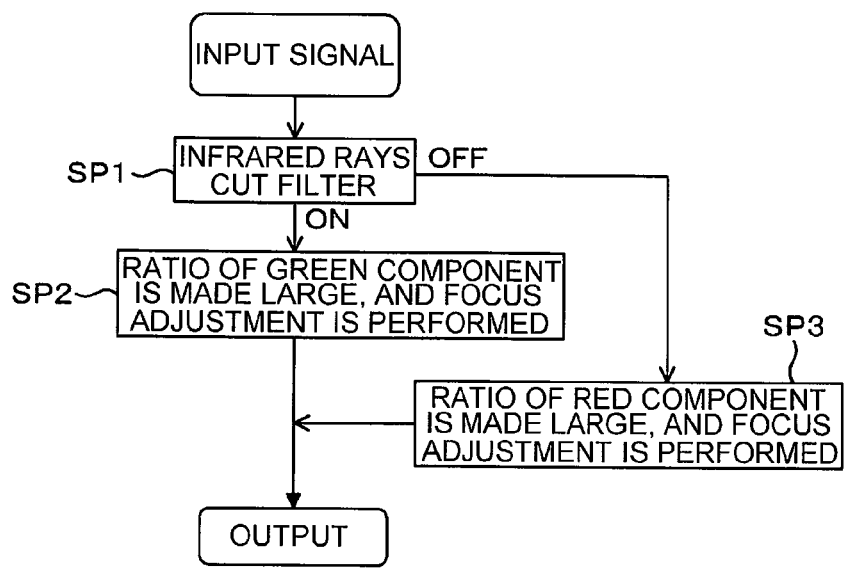
FIG. 4 is a flowchart showing a processing procedure of a focus control process of the embodiment.

FIG. 4 is a flowchart showing a processing procedure of a focus control process of the embodiment. When power supply is turned on, in the autofocus control process, the set value of ON/OFF of the infrared rays cut filter 27 recorded in the recording part 29 is sent from the control part 30 to the second signal conversion processing part 18 of the camera signal processing part 12. At step SP1, the procedure branches according to the set value of ON/OFF of the infrared rays cut filter. If the infrared rays cut filter 27 is ON, the ratio of the green component is made large (the gain for green is made larger than the gain for red and the gain for blue when conversion is performed by the second signal conversion processing part 18), and autofocus is performed (SP2). If the infrared rays cut filter 27 becomes OFF during starting of the imaging device, the ratio of the red component is made large (the gain for red is made larger than the gain for green and the gain for blue when conversion is performed by the second signal conversion processing part 18), and autofocus is performed (SP3).

As described above, when the infrared rays cut filter 27 is OFF, the focusing can be adjusted based on the color close to the input color component. Accordingly, an appropriate focusing position can be obtained, and an image becomes hard to be blurred.

Embodiment 2

In this embodiment, a description will be made on an example of autofocus when a white balance mode is adopted in which a color is corrected to a color close to a color which a person sees.

Even if the kind of light (sun light, incandescent lamp, fluorescent lamp) is changed, a human eye recognizes that white is white, and red is red. However, in a camera, the color of a photographed subject is changed according to the kind of light. In such a case, a function to perform correction to a color close to a color which a person sees is called white balance, and is installed as a camera function.

The white balance mode includes incandescent lamp, mercury lamp, sodium lamp and sun light. In the mode, when the incandescent lamp or the sodium lamp is selected, a lot of red component light is captured by the lens group 3. Thus, even when the infrared rays cut filter 27 is ON, autofocus is preferably performed based on the red component.

The control part 30 controls the white balance mode, and the recording part 29 holds the state of the white balance mode as a set value in addition of the set value in embodiment 1. When the incandescent lamp or the sodium lamp is selected as the state of the white balance mode, the control part sends the set value indicating the state to the second signal conversion processing part 18. In that case, in the second signal conversion processing part 18, the gain for red is made larger than the gain for green and the gain for blue irrespective of the state of ON/OFF of the infrared rays cut filter 27. For example, the ratio is made gain for red:gain for green:gain for blue=0.59:0.3:0.11. For example, 0.59 is used as the gain for red, 0.3 is used as the gain for green, and 0.11 is used as the gain for blue (or 1.77, 0.9 and 0.33 obtained by multiplying the respective values by 3 are used). Incidentally, the numerical values are merely exemplary, and can be appropriately changed. The ratio of the gain for red in the ratio of gain for red:gain for green:gain for blue is desirably 0.5 or higher.

The contrast signal generation part 15 generates the contrast signal VF based on the sent video signal after conversion.

Figure 5:
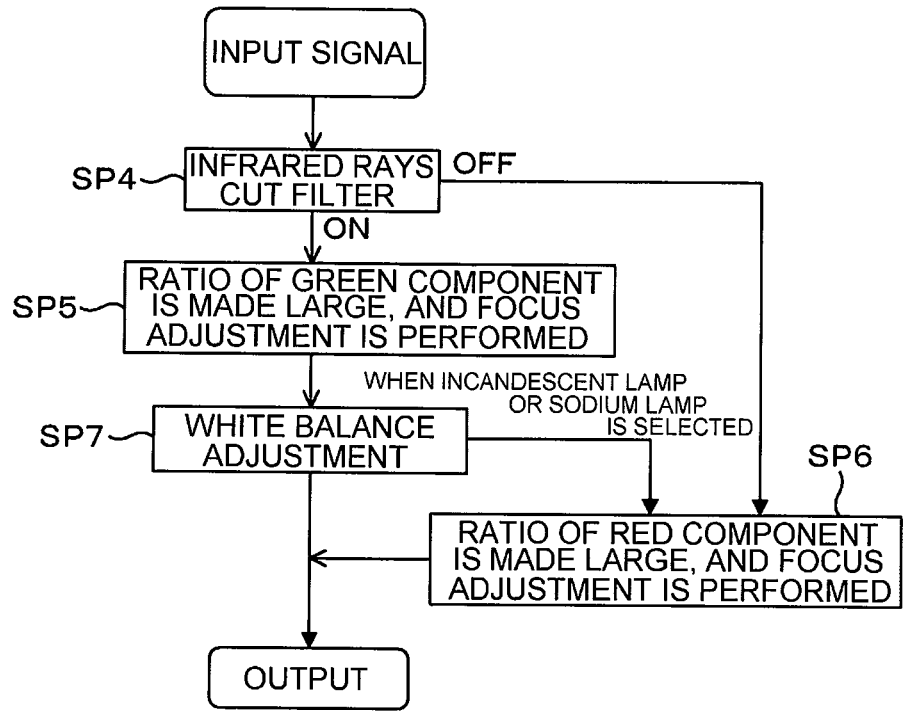
FIG. 5 is a flowchart showing a processing procedure of a focus control process of embodiment 2.

FIG. 5 is a flowchart showing a processing procedure of a focus control process of embodiment 2. The control part 30 determines whether the infrared rays cut filter is ON or OFF (SP4). If the filter is ON, the green component is made large (the gain for green is made larger than the gain for red and the gain for blue when conversion is performed by the second signal conversion processing part 18), and autofocus is performed (SP5). If the filter is OFF, the red component is made large (the gain for red is made larger than the gain for green and the gain for blue when conversion is performed by the second signal conversion processing part 18), and autofocus is performed (SP6). However, even if the infrared rays cut filter is ON, when, for example, the incandescent lamp or the sodium lamp is selected in the white balance mode (SP7), the red component is made large (the gain for red is made larger than the gain for green and the gain for blue when conversion is performed by the second signal conversion processing part 18), and autofocus is performed (SP6).

As stated above, in the incandescent lamp or the sodium lamp environment in which a lot of red component is captured, the red component is made large and autofocus is performed, so that an appropriate point of focus is obtained, and an image becomes hard to be blurred.

What is claimed is:

1. An imaging device provided with an autofocus device to move a lens to focus, comprising:

a camera signal processing part including a contrast signal generation part that extracts a high frequency component from a video signal and generates a contrast signal of the video signal based on the extracted high frequency component; and a control part to perform a focus control based on the contrast signal, wherein the control part performs an ON/OFF control of an infrared rays cut filter and includes a recording part to hold a set value of an ON/OFF state of the infrared rays cut filter, and the camera signal processing part includes a signal conversion processing part to change a ratio of RGB of the video signal to be sent to the contrast signal generation part based on the set value.

2. The imaging device according to claim 1, wherein with respect to the ratio of RGB, when the infrared rays cut filter is OFF, the ratio of a red component is made larger than the ratio of a green component and the ratio of a blue component.

3. The imaging device according to claim 2, wherein when the infrared rays cut filter is ON, the ratio of the green component is made larger than the ratio of the red component and the ratio of the blue component.

4. The imaging device according to claim 2, wherein when the infrared rays cut filter is ON, the ratio of RGB is B<R<G, and when the infrared rays cut filter is OFF, the ratio of RGB is G<B<R.

5. The imaging device according to claim 1, wherein the signal conversion processing part changes the ratio of RGB of the video signal to be sent to the contrast signal generation part by multiplying luminances of a red component, a green component and a blue component of the video signal before conversion by a gain for red, a gain for green and a gain for blue, respectively.

6. The imaging device according to claim 1, wherein the control part controls a white balance mode, and the recording part holds a state of the white balance mode as a set value, and when the white balance mode is selected, a gain for red is larger than a gain for green and a gain for blue irrespective of the ON/OFF state of the infrared rays cut filter.

* * * * *